(12) United States Patent
Yamamura

(10) Patent No.: US 8,879,153 B2
(45) Date of Patent: Nov. 4, 2014

(54) LENS ARRAY, LENS UNIT, LED HEAD, EXPOSURE UNIT, IMAGE FORMATION APPARATUS, AND READING APPARATUS

(75) Inventor: Akihiro Yamamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 260 days.

(21) Appl. No.: 13/479,525

(22) Filed: May 24, 2012

(65) Prior Publication Data

US 2012/0300309 A1   Nov. 29, 2012

(30) Foreign Application Priority Data

May 26, 2011   (JP) .................. 2011-117903

(51) Int. Cl.
- *G02B 3/02*   (2006.01)
- *H04N 1/031*   (2006.01)
- *H04N 1/028*   (2006.01)
- *H04N 1/032*   (2006.01)
- *G02B 3/00*   (2006.01)
- *G02B 27/12*   (2006.01)

(52) U.S. Cl.
CPC ............ *G02B 3/0056* (2013.01); *H04N 1/0311* (2013.01); *H04N 1/02865* (2013.01); *H04N 1/032* (2013.01); *G02B 27/123* (2013.01)
USPC .......................................................... 359/628

(58) Field of Classification Search
CPC ......... G02B 3/0043; G02B 3/02; G02B 6/003
USPC .................... 359/619, 621, 622, 628
See application file for complete search history.

(56) References Cited

U.S. PATENT DOCUMENTS

2001/0033422 A1 * 10/2001 Miura et al. ................... 359/621

FOREIGN PATENT DOCUMENTS

JP   2010-181685 A   8/2010

* cited by examiner

*Primary Examiner* — Joseph P Martinez
(74) *Attorney, Agent, or Firm* — Marvin A. Motsenbocker; Mots Law, PLLC

(57) ABSTRACT

A lens array includes arranged lenses. Each of at least two adjacent lenses in the lens array includes a first region located at and around an optical axis of the lens and having a first curvature, and a second region located farther away from the optical axis than the first region and having a second curvature. The second curvature is larger than the first curvature.

17 Claims, 17 Drawing Sheets

LENS ARRAY, LENS UNIT, LED HEAD, EXPOSURE UNIT, IMAGE FORMATION APPARATUS, AND READING APPARATUS

CROSS REFERENCE TO RELATED APPLICATIONS

This application claims priority based on 35 USC 119 from prior Japanese Patent Application No. 2011-117903 filed on May 26, 2011, entitled "LENS ARRAY, LENS UNIT, LED HEAD, EXPOSURE UNIT, IMAGE FORMATION APPARATUS, AND READING APPARATUS", the entire contents of which are incorporated herein by reference.

BACKGROUND OF THE INVENTION

1. Field of the Invention

The present disclosure relates to a lens array, a lens unit, an LED head and an exposure unit, and to an image formation apparatus and a reading apparatus using these components.

2. Description of Related Art

A conventional lens array is used in an electrophotographic image formation apparatus having an LED head in which LED elements (light emitting diodes) are linearly arranged, or is used in a reading apparatus such as a scanner or a facsimile machine having a light receiving unit including photo acceptance elements linearly arranged and configured to form an image of an original to be read. The lens array serves as an optical system that forms a same-size erect image (a same non-inverted image) of an object in the form of a line. One of such lens arrays is configured as an optical system to form a high-resolution image with microlenses arranged substantially linearly in order to form a same-size erect image of an object (for example, see Japanese Patent Application Publication No. 2010-181685; paragraphs 0018 to 0021 and FIGS. 4 and 6).

SUMMARY OF THE INVENTION

However, the above-described conventional technique has a problem in that a reading apparatus may fail to obtain image data sufficient to allow for an exact reproduction of an original in some cases because of reduction in imaging contrast. An object of the invention is to solve the problem by preventing reduction in imaging contrast.

A first aspect of the invention is a lens array including arranged lenses. Each of at least two adjacent lenses in the lens array includes: a first region located at and around an optical axis of the lens and having a first curvature; and a second region located farther away from the optical axis than the first region and having a second curvature. The second curvature is larger than the first curvature.

A second aspect of the invention is a lens unit including: lens arrays; and a light-shield member provided between the lens arrays. Each of the lens arrays includes arranged lenses. Each of at least two adjacent lenses includes: a first region located at and around an optical axis and having a first curvature; and a second region located farther away from the optical axis than the first region and having a second curvature. The second curvature is larger than the first curvature.

A third aspect of the invention is an LED head including: a lens array including arranged lenses. Each of at least two adjacent lenses includes: a first region located at and around an optical axis of the lens and having a first curvature; and a second region located farther away from the optical axis than the first region and having a second curvature. The second curvature is larger than the first curvature.

A fourth aspect of the invention is an LED head that includes: a lens unit including lens arrays and a light-shield member provided between the lens arrays. Each of the lenses arrays includes arranged lenses. Each of at least two adjacent lenses includes: a first region located at and around an optical axis of the lens and having a first curvature; and a second region located farther away from the optical axis than the first region and having a second curvature. The second curvature is larger than the first curvature.

A fifth aspect of the invention is an image formation apparatus including a lens array including arranged lenses. Each of at least two adjacent lenses includes: a first region located at and around an optical axis of the lens and having a first curvature; and a second region located farther away from the optical axis than the first region and having a second curvature. The second curvature is larger than the first curvature.

A sixth aspect of the invention is a reading apparatus including a lens array including arranged lenses. Each of at least two adjacent lenses includes: a first region located at and around an optical axis of the lens and having a first curvature; and a second region located farther away from the optical axis than the first region and having a second curvature. The second curvature is larger than the first curvature.

According to the aspects, reduction in imaging contrast can be decreased or prevented.

DETAILED DESCRIPTION OF EMBODIMENTS

Figure 1:
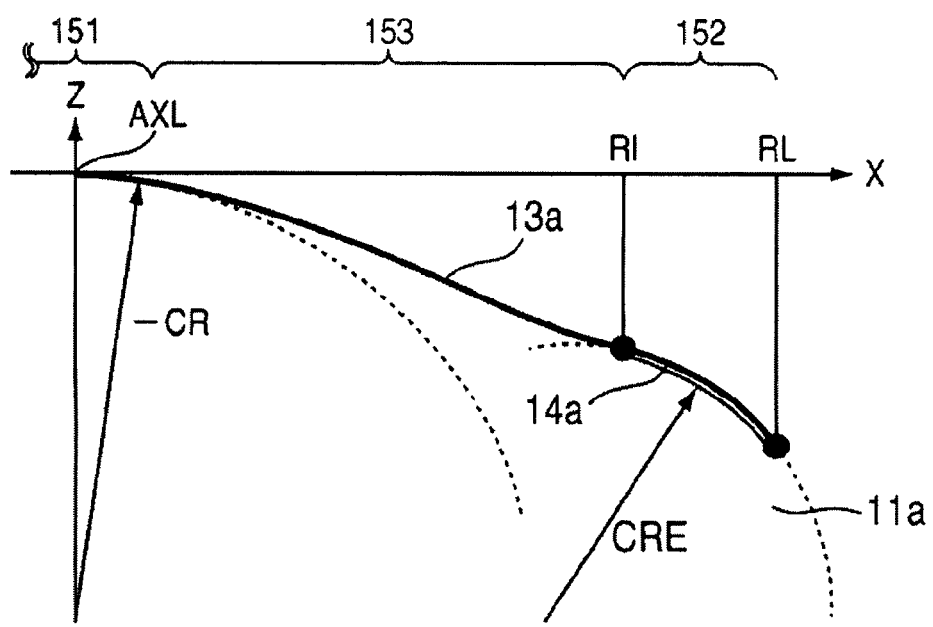
FIG. 1 is a sectional view illustrating a second lens and a crosstalk prevention portion according to a first embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

A lens array, a lens unit, an LED head, an exposure unit, an image formation apparatus, and a reading apparatus according to embodiments of the invention are described with reference to the drawings.

First Embodiment

Figure 2:
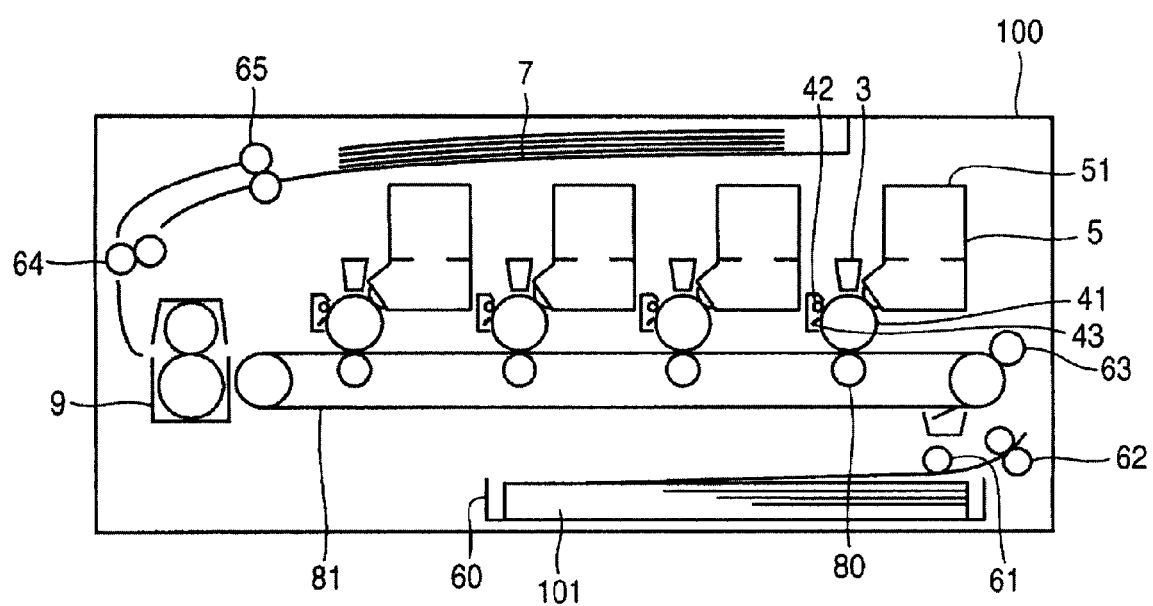
FIG. 2 is a schematic diagram illustrating a configuration of a printer according to the first embodiment.

A printer serving as an image formation apparatus of a first embodiment is described with reference to the schematic diagram in FIG. 2 which illustrates a configuration of the printer of the first embodiment. Referring to FIG. 2, printer 100 forms an image on a print medium in accordance with image data using toner made of a resin that contains a pigment as a coloring material.

Paper cassette 60 is attached to printer 100 and is configured to store a stack of paper 101 as print media. Printer 100 includes feed roller 61 and transport rollers 62 and 63. Feed roller 61 picks up paper 101 from paper cassette 60 while transport rollers 62 and 63 feed and transport paper 101. Printer 100 in this embodiment is an electrophotographic color printer and includes image formation units arranged along a transport path and configured to form yellow, magenta, cyan, and black images, respectively. Each of the image formation units includes photoconductive drum 41 serving as an electrostatic latent image carrier, developer 5 configured to develop a toner image on photoconductive drum 41 by supplying toner to the electric latent image formed on photosensitive drum 41, and toner cartridge 51 configured to supply the toner to developer 5.

Meanwhile, charging roller 42 configured to supply electric charges and thereby to electrically charge a surface of photosensitive drum 41, and LED head 3 serving as an optical head are disposed facing the surface of photosensitive drum 41. LED head 3 selectively irradiates the surface of photoconductive drum 41, which is charged by charging roller 42, with light and forms an electrostatic latent image thereon in accordance with the image data.

In addition, there are provided transfer rollers 80 configured to transfer the toner images onto the paper 101. Here, the toner images are visualized images of the electrostatic latent images formed on photosensitive drums 41 by use of the toner. Each transfer roller 80 is located opposite to photosensitive drum 41 at each transfer section in a manner so as to sandwich a transfer belt 81 configured to transport paper 101. Moreover, there are provided cleaning blades 43 configured to scrape the residual toner off the surfaces of photosensitive drums 41 after the toner images are transferred to paper 101 at the transfer sections. Each cleaning blade 43 is disposed in contact with the surface of photoconductive drum 41.

Fixation unit 9 is disposed downstream of the transfer sections. Fixation unit 9 is configured to fix the toner images onto paper 101 by application of heat and pressure. On the downstream, there are also disposed transport rollers 64 configured to transport paper 101 after paper 101 passes fixation unit 9, and discharge rollers 65 configured to discharge paper 101 to discharge portion 7 which stores paper 101 transported by transport rollers 64 and provided with the images thereon.

An unillustrated power supply applies predetermined voltages to charging rollers 42 and transfer rollers 80. Transfer belt 81, photoconductive drums 41, and the respective rollers are rotated by unillustrated motors and unillustrated gears. Moreover, the power supply and a control device are connected to developers 5, LED heads 3, fixation units 9, and the unillustrated motors.

Printer 100 includes an external interface configured to receive print data from an external apparatus, and prints an image on the print medium in accordance with the print data received by the external interface. Printer 100 of the above-described configuration also includes a storage unit such as a memory configured to store control programs, and a controller serving as controlling means and arithmetic operation means, which is configured to perform overall control of printer 100 based on the control programs.

Figure 3:
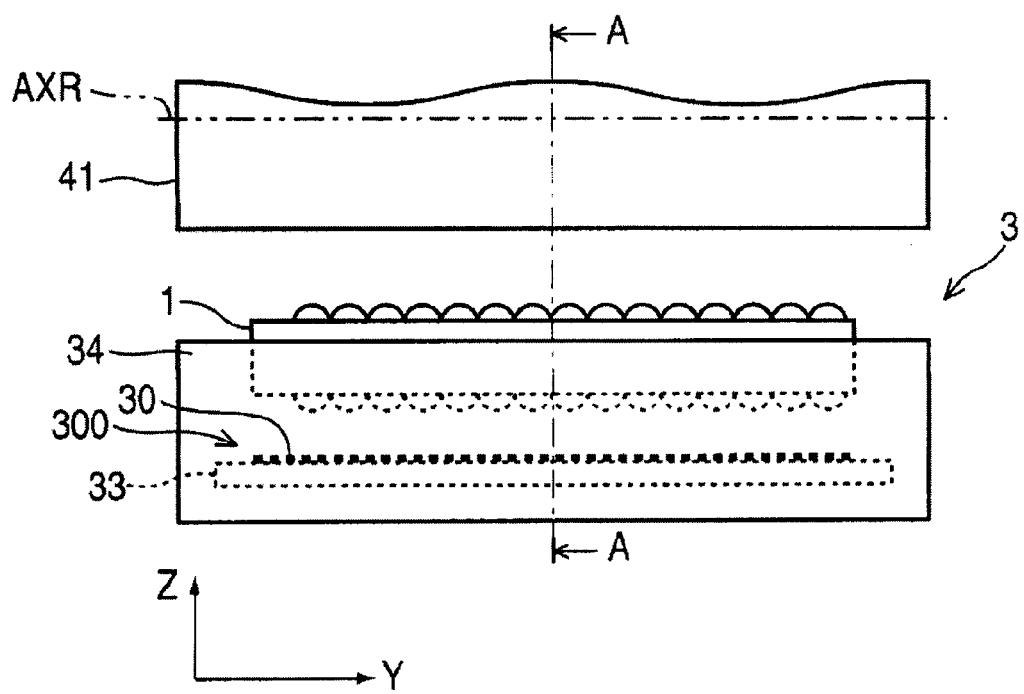
FIG. 3 is a schematic side elevation view illustrating an LED head according to the first embodiment.

FIG. 3 is a schematic side elevation view illustrating LED head 3 according to the first embodiment. As shown in FIG. 3, lens unit 1 is provided in LED head 3 which serves as an exposure unit. Holder 34 is provided to fix lens unit 1 to LED head 3. LED elements 30 collectively serve as a light emission unit and are arranged substantially linearly to constitute LED array 300. LED elements 30 are arranged in a Y-axis direction (which is the horizontal direction in FIG. 3). Lens unit 1 is elongated and is placed in a manner that the longitudinal side of lens unit 1 extends in the Y-axis direction (i.e., in the horizontal direction in FIG. 3), that is, in parallel to the longitudinal direction of LED array 300.

Reference numeral 41 denotes a photosensitive drum on which an electrostatic latent image is formed. AXR denotes the rotational axis of photosensitive drum 41. Photosensitive drum 41 is placed in such a manner that rotational axis AXR extends in the Y-axis direction (i.e., in the horizontal direction in FIG. 3), that is, in parallel to the longitudinal sides of LED array 300 and of lens unit 1. Microlenses are provided in lens unit 1 in a manner that the optical axis of each microlens of lens unit 1 extends in a Z-axis direction (i.e., in the vertical direction in FIG. 3).

Figure 4:
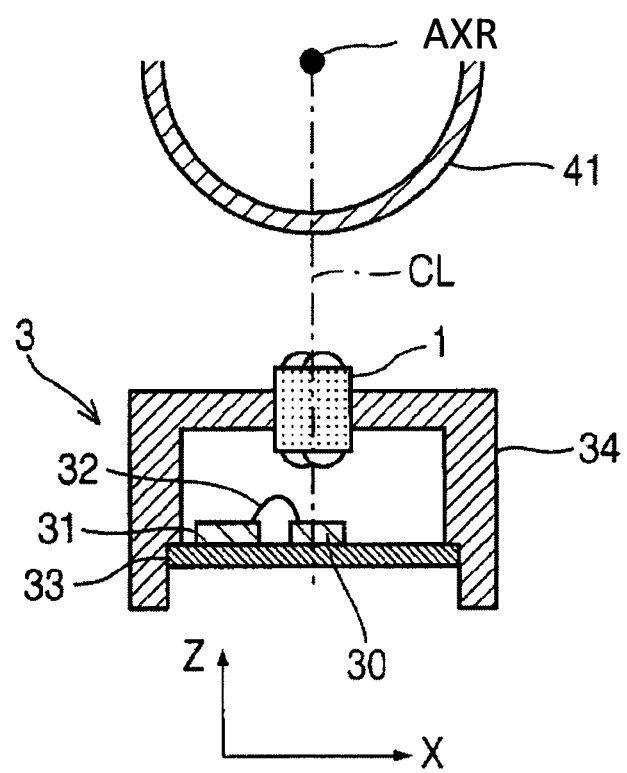
FIG. 4 is a sectional view illustrating the LED head according to the first embodiment.

FIG. 4 is a sectional view illustrating LED head 3 according to the first embodiment. FIG. 4 shows a cross section of LED head of FIG. 3 taken along the line A-A. Now, a width direction of lens unit 1 is defined as the direction that is perpendicular both to the longitudinal direction of lens unit 1 and to the direction of the optical axis of each microlens included in lens unit 1. Hence, the width direction of lens unit 1 is aligned with an X-axis direction indicated (i.e., the horizontal direction in FIG. 4). Assuming that CL in FIG. 4 denotes the center line of lens unit 1 in the width direction thereof, LED elements 30 and rotational axis AXR of photosensitive drum 41 are located on a straight line obtained by extending center line CL by extrapolation.

In addition, lens unit 1 is placed such that the optical axis of each microlens is aligned with the Z-axis direction (i.e., the vertical direction in FIG. 4). LED elements 30 and driver IC 31 are mounted on circuit board 33, and are electrically connected to one another by means of wires 32.

Figure 5:
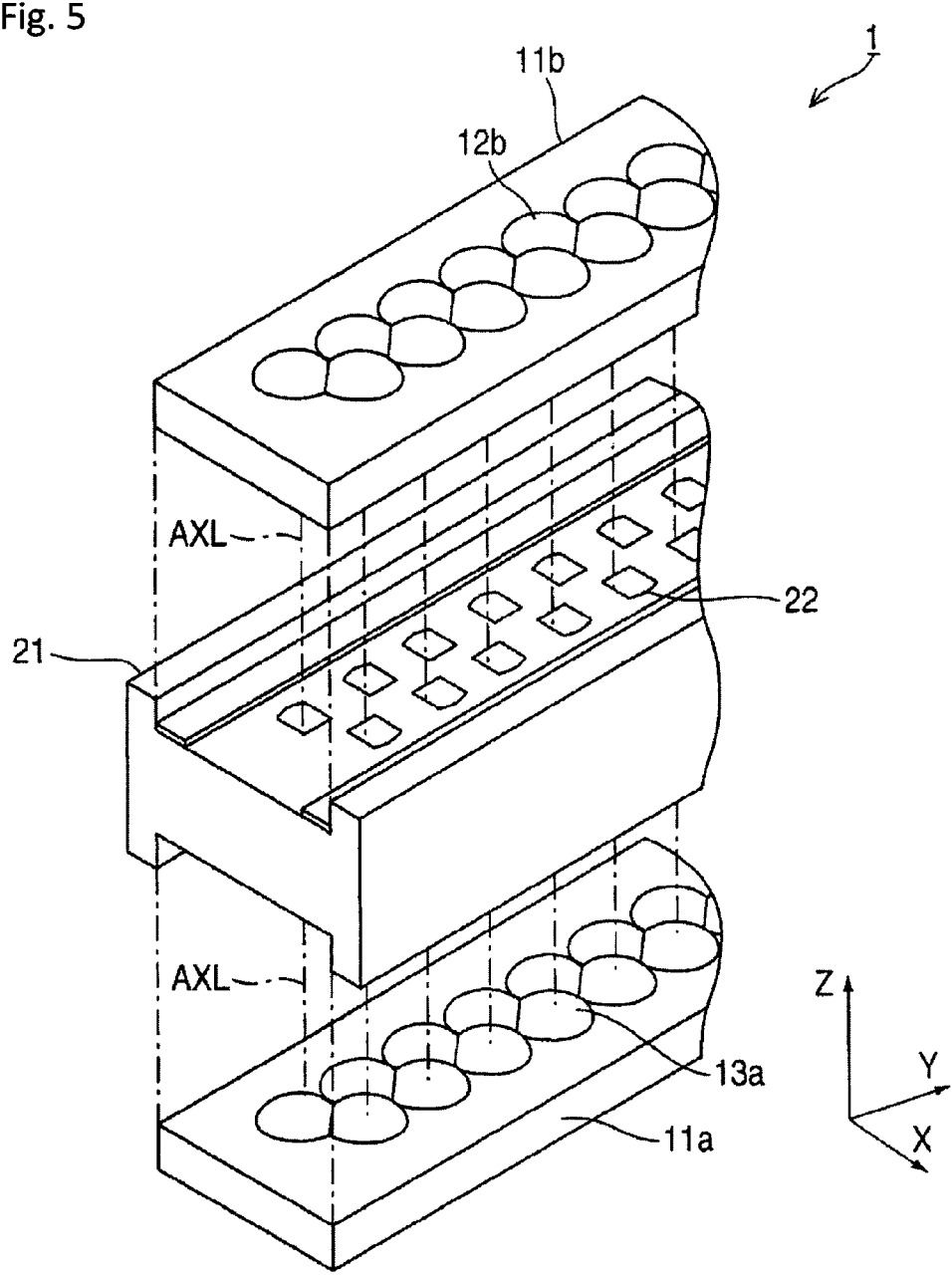
FIG. 5 is an exploded perspective view illustrating a lens unit according to the first embodiment.

FIG. 5 is an exploded perspective view illustrating lens unit 1 according to the first embodiment. As shown in FIG. 5, lens unit 1 includes two lens arrays and a light-shield member. Reference numeral 11a denotes first lens plate 11a serving as a lens array on an object plane side. Reference numeral 11b denotes a second lens plate serving as a lens array on an image plane side. Reference numeral 21 denotes light-shield plate 21 which serves as the light-shield member.

First lens plate 11a and second lens plate 11b are provided to face each other while interposing light-shield plate 21 therebetween. First lenses 12a are arranged in two rows on one of surfaces of first lens plate 11a, and second lenses 13a are arranged in two rows on the other surface of first lens plate 11a. Meanwhile, first lenses 12b are arranged in two rows on one of surfaces of second lens plate 11b, and second lenses 13b are arranged in two rows on the other surface of second lens plate 11b.

Lens unit 1 is an elongated unit. First lenses 12a and second lenses 13a are arranged in the longitudinal direction of first lens plate 11a (i.e., in the Y-axis direction). First lenses 12b and second lenses 13b are arranged in the longitudinal direction of second lens plate 11b (the Y-axis direction). Lens unit 1 is placed in such a manner that optical axes AXL of all first lenses 12a, second lenses 13a, first lenses 12b, and second lenses 13b are aligned with the Z-axis direction (i.e., the vertical direction in FIG. 5).

Apertures 22 serving as diaphragms are formed in light-shield plate 21. Apertures 22 are arranged in the longitudinal direction of lens unit 1. First lenses 12a, second lenses 13a, first lenses 12b, and second lenses 13b are arranged at the same pitch such that optical axes AXL of the lenses coincide with one another.

As described above, lens unit 1 is provided with a group of lenses including two plates of microlenses (i.e., first lens plate 11a and second lens plate 11b) and the diaphragms (i.e., light-shield plate 21). The lenses are arranged substantially linearly in a direction perpendicular to the direction of the optical axes of the lenses.

Figure 6:
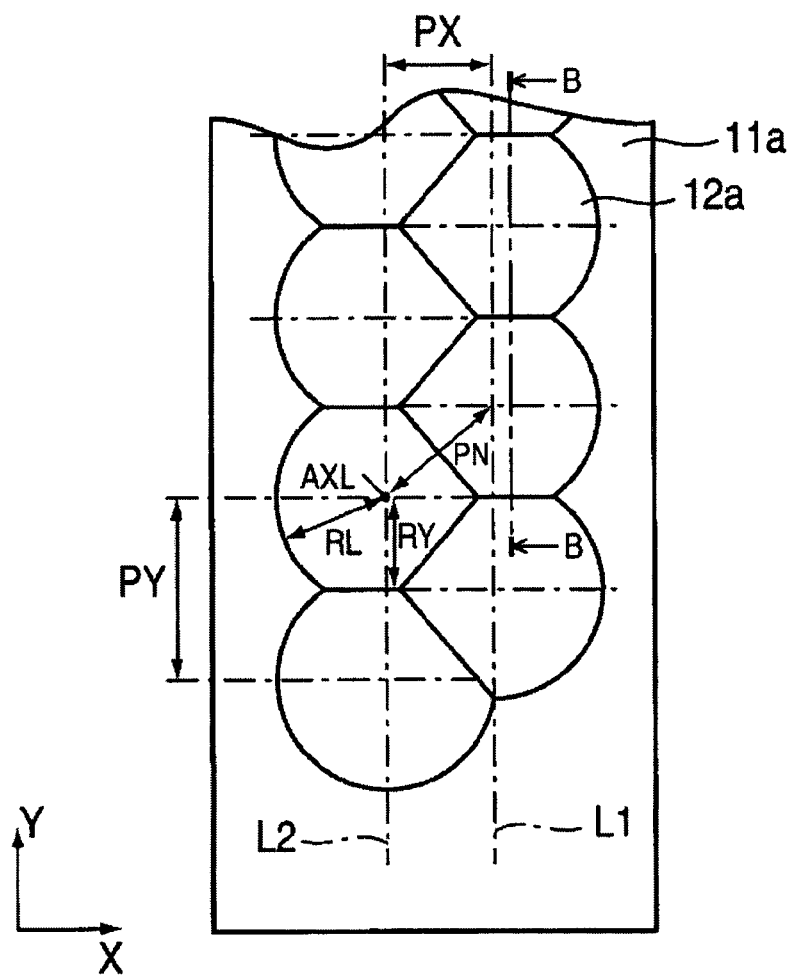
FIG. 6 is a plan view illustrating a first lens plate according to the first embodiment.

FIG. 6 is a plan view illustrating first lens plate 11a according to the first embodiment. In FIG. 6, the Y-axis direction (i.e., the vertical direction in the drawing) is the longitudinal direction of first lens plate 11a. As shown in FIG. 6, first lenses 12a are arranged on first lens plate 11a in two rows each extending in a direction perpendicular to their respective optical axes that are parallel to one another. To be more specific, lenses 12a provided on lens plate 11a are classified into two groups, namely, a first group including lenses 12a arranged along lens line L1 and a second group including lenses 12a arranged along lens line L2. The phase of lenses 12a that are arranged along lens line L1 is shifted from the phase of lenses 12a that are arranged along lens line L2 in the longitudinal direction of lens plate 11a. Hence, all the lenses 12a provided on lens plate 11a are arranged in a zigzag pattern.

Though not illustrated in FIG. 6, second lenses 13a are arranged in two rows on the back surface of first lens plate 11a. Optical axis AXL of each first lens 12a coincides with optical axis AXL of corresponding second lens 13a. First lenses 12a are arranged in the longitudinal direction of first lens plate 11a (i.e., in the Y-axis direction in FIG. 6) at pitch PY, and are arranged in the width direction of the first lens plate 11a (i.e., in the X-axis direction in FIG. 6) at pitch PX. Note that pitch PY is larger than pitch PX (PY>PX). In addition, pitch PN is defined as a distance between the center optical axis point of two adjacent lenses respectively located on the two rows.

First lenses 12a are arranged in a dense and compact manner. An outer edge of each first lens 12a is in contact with an outer edge of adjacent first lens 12a. Hence, first lenses 12a are placed continuously without any spaces. Specifically, radius RY of each first lens 12a in terms of the longitudinal direction of first lens plate 11a is equal to a value (PY/2). In addition, radius RL of each first lens 12a of first lens plate 11a is larger than the value (PY/2). Further, radius RL of each first lens 12a of first lens plate 11a is larger than a value (PN/2). Note that first lens plate 11a is made of a material that transmits light rays emitted from the light emission unit.

Figure 7:
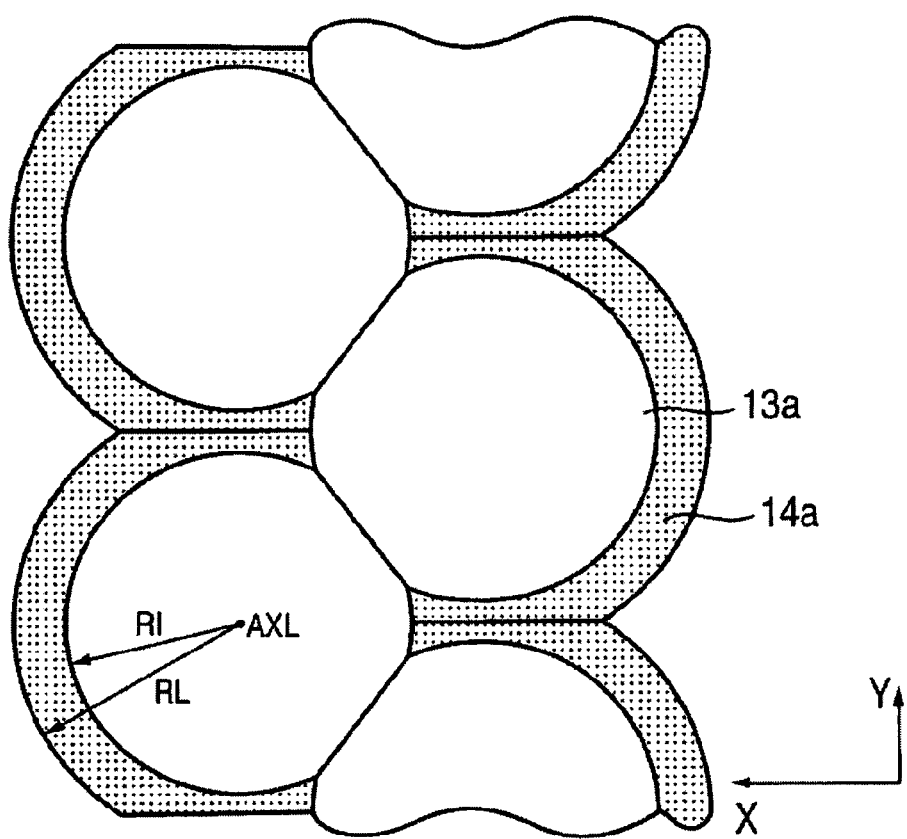
FIG. 7 is a plan view illustrating the back surface of the first lens plate according to the first embodiment.

FIG. 7 is a plan view illustrating first lens plate 11a according to the first embodiment, which shows the back surface of first lens plate 11a in FIG. 5. The Y-axis direction in FIG. 7 (i.e., the vertical direction in the drawing) coincides with the longitudinal direction of first lens plate 11a. Second lenses 13a in FIG. 7 are arranged at the same pitch as the arrangement pitch of first lenses 12a described in conjunction with FIG. 6. In addition, optical axis AXL of each first lens 12a coincides with optical axis AXL of corresponding second lens 13a.

Crosstalk prevention portions 14a are provided around outer peripheral portions of second lenses 13a. Crosstalk prevention portions 14a are formed in a manner that so-called crosstalk light, representing light that passes through gaps between adjacent lenses, can be blocked by light-shield plate 21 shown in FIG. 5. Each crosstalk prevention portion 14a is located near a border between two adjacent second lenses 13a.

Here, each crosstalk prevention portion 14a is located at the border between two adjacent lenses 12a located on the same line out of lens lines L1 and L2 shown in FIG. 6. This is because arrangement pitch 2RY for adjacent lenses 12a on the same lens line is greater than arrangement pitch PN for adjacent lenses 12a on the different lens lines. Crosstalk can be prevented without reducing light intensity by forming prevention portion 14a at the border at the larger pitch. The configuration of this embodiment can prevent the crosstalk by providing lenses 12a densely in lens lines L1 and L2 on lens plate 11a in accordance with the above-described conditions.

When a region between a region at and around optical axis AXL (hereinafter referred to as the "neighborhood of optical axis AXL") of each second lens 13a and crosstalk prevention portion 14a is defined as an intermediate portion, a curvature of the intermediate portion is smaller than a curvature of the neighborhood of optical axis AXL. In addition, a curvature of crosstalk prevention portion 14a is larger than the curvature of the intermediate portion.

Radius RI of second lens 13a is smaller than radius RL of the area including second lens 13a and adjacent crosstalk prevention portion 14a. In addition, radius RI of second lens 13a is smaller than the value (PY/2) and is greater than the value (PN/2). Note that PY denotes the arrangement pitch of first lenses 12a in the longitudinal direction in FIG. 6, and that PX denotes the arrangement pitch of first lenses 12 in the width direction in FIG. 6. Each of curved surfaces of first lenses 12a and second lenses 13a shown in FIGS. 6 and 7 is formed as a rotationally symmetrical high order aspheric surface defined by the following Numerical Expression 1:

$$Z(r) = \frac{\frac{r^2}{CR}}{1+\sqrt{1-\left(\frac{r}{CR}\right)^2}} + Ar^4 + Br^6 + Cr^8 \quad \text{(Numerical Expression 1)}$$

where CR is a negative number (−CR) and denotes a curvature radius of the neighborhood of optical axis AXL, A denotes a fourth-order aspheric coefficient, B denotes a sixth-order aspheric coefficient, and C denotes an eighth-order aspheric coefficient. The function Z(r) expresses a side made of the material of lens plate 11a, 11b with respect to the origin equivalent to an apex of each lens surface. The function defines such a side by using a negative value. The value r represents a rotating system of coordinates in the radial direction while defining the direction parallel to the optical axis of each first lens 12a as an axis. The value r has a relationship with respective coordinates in X and Y directions shown in the drawings, which is defined by the following Numerical Expression 2:

$$r = \sqrt{X^2 + Y^2} \quad \text{(Numerical Expression 2)}$$

Next, the shape of each second lens 13a of this embodiment is described with reference to FIG. 1. FIG. 1 is a sectional view illustrating second lens 13a and crosstalk prevention portion 14a according to the first embodiment. The Z-axis direction (the vertical direction) in FIG. 1 is the direction parallel to optical axis AXL. The X-axis direction (the horizontal direction) in FIG. 1 is a direction (the width direction) perpendicular to the longitudinal direction of lens unit 1.

In FIG. 1, each second lens 13a is a convex lens and has a curved surface that is the rotationally symmetric high order aspheric surface expressed by Numerical Expression 1. In second lens 13a, the curvature radius of the neighborhood of optical axis AXL is defined as curvature radius (−CR) in Numerical Expression 1. Each crosstalk prevention portion 14a has a curved surface with curvature radius CRE.

As shown in FIG. 1, the curved line of second lens 13a is the border line separating the material of first lens plate 11a from the air. The region below the curved line represents the material of first lens plate 11a while the region above the curved line represents the air. In the neighborhood of optical axis AXL, the curved line of second lens 13a substantially coincides with the perimeter of the circle with radius (−CR). In crosstalk prevention portion 14a, the curved line substantially coincides with the perimeter of the circle with radius CRE.

A region in the neighborhood of optical axis AXL of second lens 13a is defined as region 151 and a region for crosstalk prevention portion 14a is defined as region 152. In addition, a region between regions 151 and 152 is defined as intermediate portion 153. Then, the curvature of intermediate portion 153 is smaller than the curvature of region 151 in the neighborhood of optical axis AXL. The curvature of region 152 for crosstalk prevention portion 14a is larger than the curvature of intermediate portion 153. Note that the curvature of region 151 in the neighborhood of optical axis AXL is a curvature of an inscribed circle at optical axis AXL which is indicated with a broken line in the drawing.

Specifically, the curvature radius of intermediate portion 153 is larger than curvature radius (−CR) of region 151 in the neighborhood of optical axis AXL, and curvature radius CRE of region 152 for crosstalk prevention portion 14a is smaller than the curvature radius of intermediate portion 153.

As described above, each second lens 13a included in first lens plate 11a, which serves as a lens array, has region 151, region 152, and intermediate portion 153. Region 151 is a first region that is a peak portion of the surface in the neighborhood of the optical axis of the lens. Region 152 is a second region or an outer peripheral portion for crosstalk prevention portion 14a, which is located farther away from the optical axis than the first region and located outside of the effective range of second lens 13. Intermediate portion 153 is a third region that connects the first region and the second region to each other.

Moreover, when the curvature of the first region (region 151) is defined as first curvature X1, the curvature of the second region (region 152) is defined as second curvature X2, and the curvature of the third region (intermediate portion 153) is defined as third curvature X3, respectively, then there is a relationship expressed as second curvature X2>first curvature X1>third curvature X3.

Second lens plate 11b shown in FIG. 5 has a similar configuration to the configuration of first lens plate 11a, and includes first lenses 12b, unillustrated second lenses 13b, and unillustrated crosstalk prevention portions 14b. First lenses 12b, second lenses 13b, and crosstalk prevention portions 14b of second lens plate 11b are similar to their respective counterparts of the first lens plate 11a, namely, first lenses 12a, second lenses 13a, and crosstalk prevention portions 14a.

Figure 8:
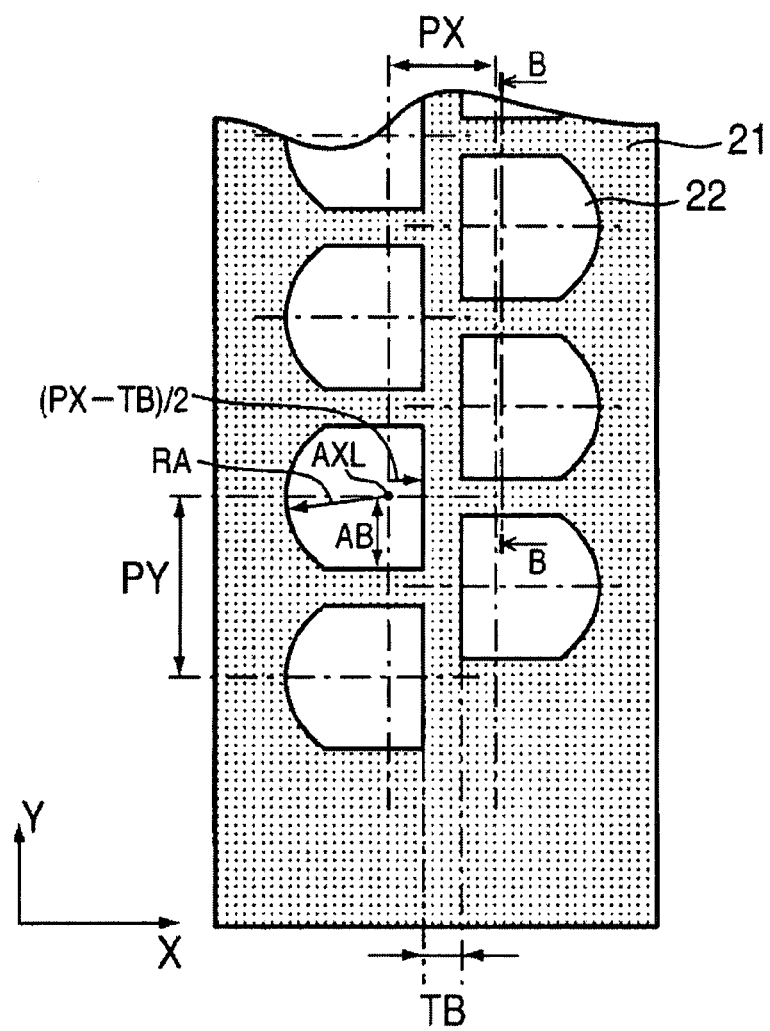
FIG. 8 is a plan view illustrating a light-shield plate according to the first embodiment.

FIG. 8 is a plan view illustrating light-shield plate 21 according to the first embodiment. In FIG. 8, the Y-axis direction (the vertical direction) is the longitudinal direction of light-shield plate 21 while the X-axis direction (the horizontal direction) is a direction perpendicular to the longitudinal direction of light-shield plate 21. As shown in FIG. 8, apertures 22 are formed in light-shield plate 21. Light rays that enter the lenses pass through apertures 22. Apertures 22 are arranged substantially linearly in the longitudinal direction of light-shield plate at the same pitch as the arrangement pitch for first lenses 12a as shown in FIG. 6. Distance TB is the distance between every two apertures 22 that are adjacent to each other in the X-axis direction, that is, the direction perpendicular to the longitudinal direction of light-shield plate 21.

Each aperture 22 has a shape surrounded by an arc of a circle with radius RA, a straight line located at a distance of (PX−TB)/2 away from the center of the circle with radius RA in the X-axis direction, that is, the direction perpendicular to the longitudinal direction of light-shield plate 21, and straight lines each being located at distance AB away from the center of the circle with radius RA in the Y-axis direction, that is, the longitudinal direction of light-shield plate 21. Note that radius RA is larger than distance AB (i.e., RA>AB). The pitch PX in FIG. 8 refers to the distance between the centers of adjacent circles with radius RA in the X-axis direction (i.e., the direction perpendicular to the longitudinal direction of light-shield plate 21).

The position of each optical axis AXL coincides with the center of the circle with radius RA forming a part of corresponding aperture 22. Light-shield plate 21 is made of a material capable of blocking the light rays emitted from the light emission unit. Internal walls of each aperture 22 collectively serve as a light-shield portion to block the light rays.

Figure 9:
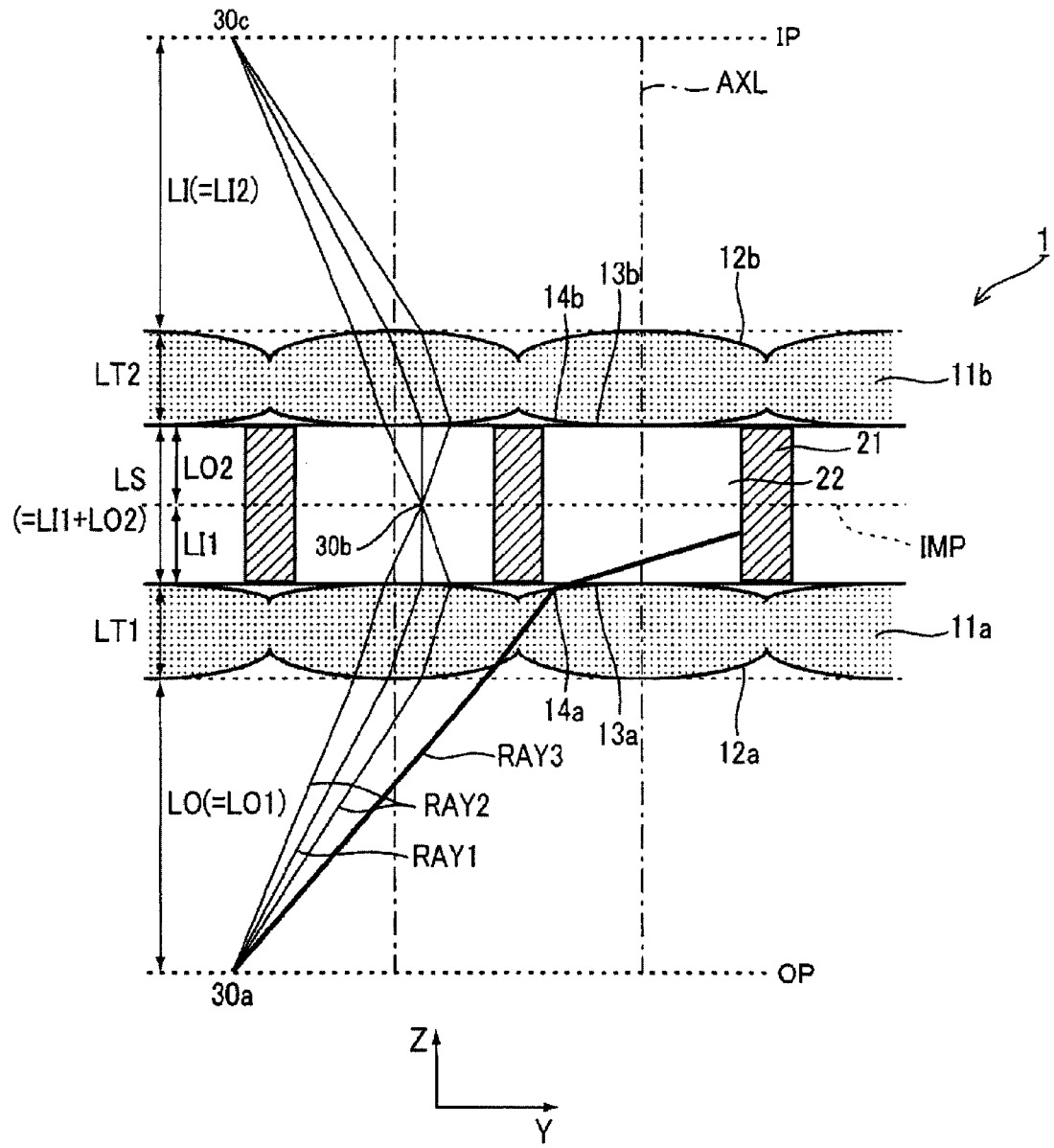
FIG. 9 is a sectional view illustrating the lens unit according to the first embodiment.

FIG. 9 is a sectional view illustrating lens unit 1 according to the first embodiment, which is a sectional view of lens unit 1 taken along the line B-B shown in FIGS. 6 and 8. Note that in FIG. 9, the Y-axis direction (the horizontal direction) is the longitudinal direction of lens unit 1 whereas the Z-axis direction (the vertical direction) is the direction of optical axis AXL.

As shown in FIG. 9, each first lens 12a of first lens plate 11a is located in a position at distance L0 away from object plane OP. LT1 denotes a distance between the surface of each first lens 12a and the surface of corresponding second lens 13a, which is equivalent to the thickness of the compound lens of first lens 12a and second lens 13a. In addition, second lenses 13a of first lens plate 11a face second lenses 13b of second lens plate 11b on a one-to-one basis in a manner that optical axis AXL of each second lens 13a coincides with optical axis AXL of corresponding second lens 13b. Note that each second lens 13a is separated from corresponding second lens 13b at distance LS.

Light-shield plate 21 is placed between second lens 13a and second lens 13b. LT2 denotes a distance between each first lens 12b and corresponding second lens 13b, which is equivalent to the thickness of the compound lens of first lens 12b and second lens 13b. The image plane of lens unit 1 is located at distance LI away from first lenses 12b in the direction of optical axis AXL.

Each first lens 12a and corresponding second lens 13a form intermediate image 30b as an image of object 30a existing in a position located at distance LO1 away from the surface of first lens 12a in the direction of optical axis AXL. Intermediate image 30b is formed on intermediate image plane IMP located at distance L11 away from the surface of second lens 13a in the direction of optical axis AXL. Here, intermediate image 30b is formed into a reduced inverted image of object 30a.

Each first lens 12b and corresponding second lens 13b form image 30c of intermediate image 30b, which exists in a position at distance L2 away from the surface of each second lens 13b in the direction of optical axis AXL, on image plane IP that is located at distance L12 away from the surface of each first lens 12b in the direction of optical axis AXL. Image 30c is formed into a same-size erect image (a same-size non-inverted image) of object 30a.

In lens unit 1, distance L0 between object plane OP and the surface of each first lens 12a is set equal to distance LO1. In addition, interval LS between the surface of each second lens 13a and the surface of corresponding second lens 13b is set equal to the sum of distance LI1 and distance LO2 (i.e., LS=LI1+LO2). In lens unit 1, distance LI between the surface of each first lens 12b and image plane IP is set equal to distance LI2.

Operations of the above-described configuration are described. First, operations of printer 100 are described with reference to FIG. 2. In printer 100, the surface of each photosensitive drum 41 is electrically charged by corresponding charging roller 42 to which a certain voltage is applied from the unillustrated power supply. Then, when the charged surface of photosensitive drum 41 approaches LED head 3 by the rotation of photosensitive drum 41, the charged surface is exposed to LED head 3 whereby an electrostatic latent image is formed thereon. The electrostatic latent image is developed by developer 5, and a toner image is formed on the surface of photosensitive drum 41.

In the meantime, paper 101 set in paper cassette 60 is taken out of paper cassette 60 with feed roller 61, and then transported to a position near transfer roller 80 and transfer belt 81 by transport rollers 62 and 63. When the toner image on the surface of photosensitive drum 41 obtained by the development approaches transfer roller 80 and transfer belt 81 by the rotation of photosensitive drum 41, the toner image on the surface of photosensitive drum 41 is transferred onto paper 101 by means of transfer belt 81 and transfer roller 80 to which the voltage is applied from the unillustrated power supply.

Subsequently, paper 101 provided with the toner image on the surface is transported to fixation unit 9 along the rotation of transfer belt 81, and the toner image on paper 101 is melted by application of pressure and heat from fixation unit 9 and is fixed onto the surface of paper 101. Paper 101 after fixation of the toner image is then discharged to discharge portion 7 by transport rollers 64 and discharge rollers 65. Thus the operations of printer 100 are completed.

Next, operations of LED head 3 serving as the exposure unit are described with reference to FIG. 4. When the controller of printer 100 sends a control signal to control LED head 3 based on image data, driver IC 31 makes LED elements 30 emit light at predetermined light intensities in accordance with the control signal. The light rays emitted from LED elements 30 enter lens unit 1, whereby an image is formed on the surface of photosensitive drum 41.

Next, operations of lens unit 1 are described with reference to FIG. 9. RAY1 denotes a principal ray sent from object 30a and passing through the optical system. Each RAY2 denotes a marginal ray from object 30a. By means of first lens 12a and second lens 13a, a reduced inverted image 30b of object 30a is formed on intermediate image plane IMP. Marginal rays RAY2 and principal ray RAY1 come into focus at the position of intermediate image 30b.

Then, by means of first lens 12b and second lens 13b, image 30c is formed as an enlarged inverted image of intermediate image 30b on image plane IP. Marginal rays RAY2 and principal ray RAY1 again come into focus at the position of image 30c. Note that image 30c is a same-size erect image of object 30a.

In addition, principal rays RAY1 from points on the object plane are parallel to one another, i.e., telecentric in a region between second lens 13a and second lens 13b. Meanwhile, RAY3 denotes a crosstalk ray included in the light rays sent from object 30a, which enters second lens 13a having optical axis AXL that is different from optical axis AXL of first lens 12a.

In this embodiment, crosstalk prevention portion 14a is formed on each second lens 13a. Accordingly, crosstalk ray RAY3 is refracted by crosstalk prevention portion 14a on adjacent second lens 13a and is then blocked by the internal wall of aperture 22 formed in light-shield plate 21.

Figure 11A:
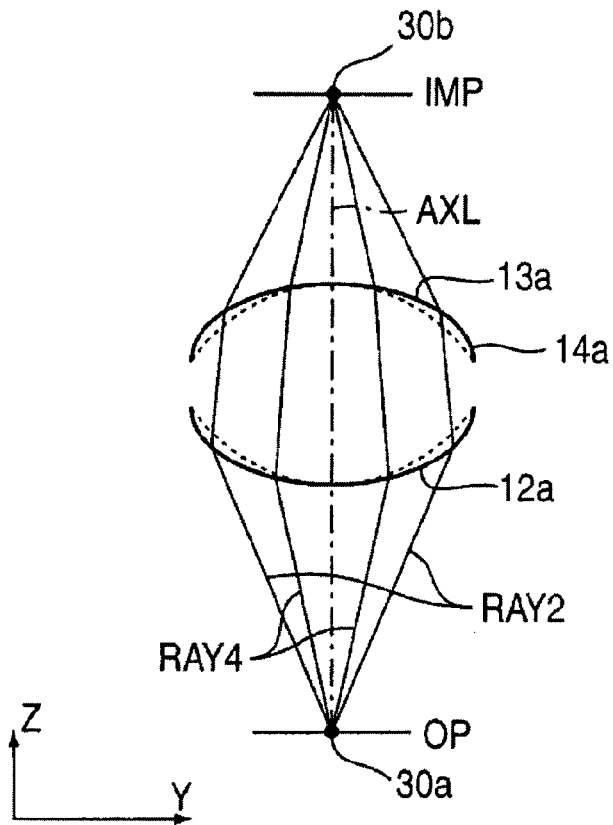
FIGS. 11A and 11B are explanatory diagrams illustrating an operation of the second lens according to the first embodiment.
Figure 11B:
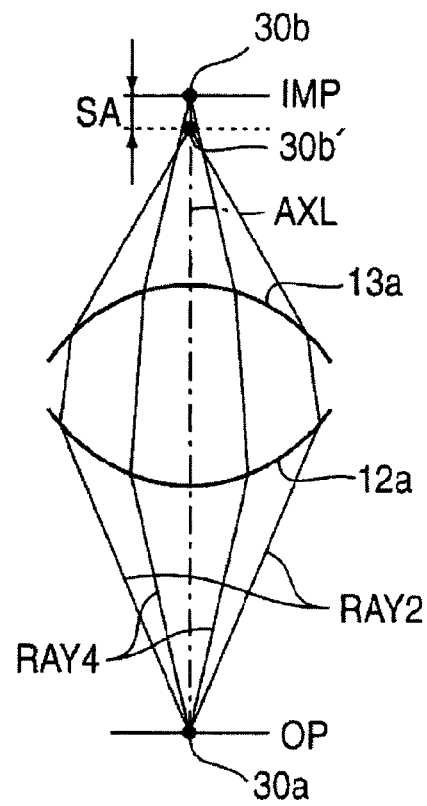

Next, the shape of each second lens 13a according to the first embodiment and an effect of the shape are described with reference to FIGS. 11A and 11B, which are explanatory diagrams illustrating an operation of second lens 13a according to the first embodiment. FIGS. 11A and 11B are sectional views of each first lens 12a and each second lens 13a. In each of FIGS. 11A and 11B, the Z-axis direction (the vertical direction) is the direction parallel to optical axis AXL, and the Y-axis direction (the horizontal direction) coincides with the longitudinal direction of lens unit 1.

FIG. 11A shows the configuration according to the first embodiment. When the region (region 153 shown in FIG. 1) between the neighborhood of optical axis AXL of second lens 13a and crosstalk prevention portion 14a (region 152 shown in FIG. 1) is defined as the intermediate portion, the curvature of intermediate portion is smaller than the curvature of the neighborhood of optical axis AXL in FIG. 11A. On the other hand, FIG. 11B shows a different lens from the embodiment, in which the curvature of the aforementioned intermediate portion is not smaller than the curvature of the neighborhood of optical axis AXL.

Among all the light rays sent from object 30a located on object plane OP in FIGS. 11A and 11B, the light rays that pass through portions near the outer periphery of second lens 13a are hereinafter referred to as marginal rays RAY2 and the rays that pass through portions near optical axis AXL of second lens 13a are referred to as paraxial rays RAY4. Then, in the configuration of the first embodiment shown in FIG. 11A, all marginal rays RAY2 and paraxial rays RAY4 come into focus as intermediate image 30b on intermediate image surface IMP because the curvature of the intermediate portion is smaller than the curvature of the neighborhood of optical axis AXL.

On the other hand, in the case of the lens shown in FIG. 11B where the curvature of the intermediate portion is not smaller than the curvature of the neighborhood of optical axis AXL, marginal rays RAY2 come into focus at position 30b', which is a position closer to the lens than intermediate image plane IMP by distance SA due to spherical aberration, whereas paraxial rays RAY4 come into focus as intermediate image 30b on intermediate image plane IMP. As a consequence, the contrast of intermediate image 30b is reduced.

Figure 12A:
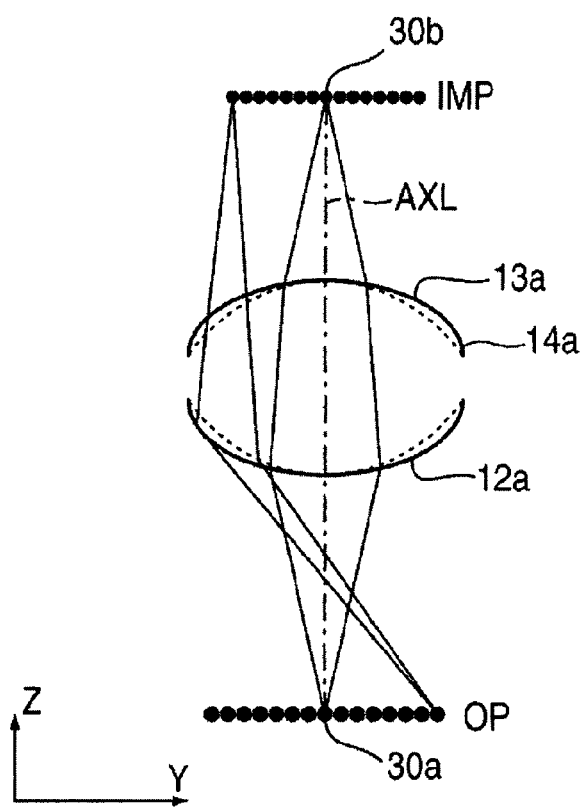
FIGS. 12A and 12B are explanatory diagrams illustrating another operation of the second lens according to the first embodiment.
Figure 12B:
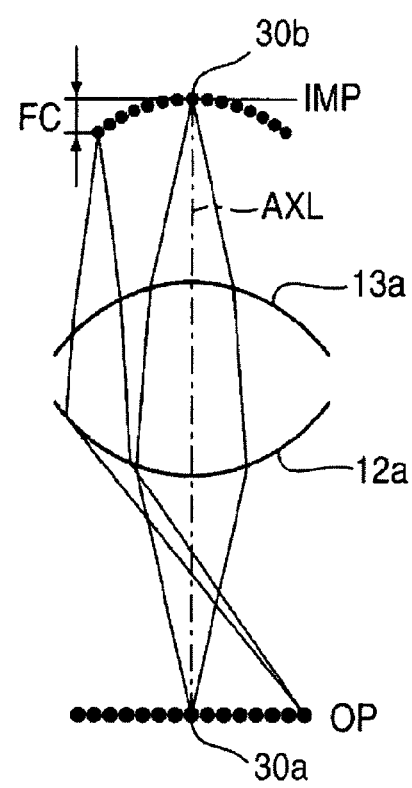

The shape of each second lens 13a according to the first embodiment and another effect of the shape are described with reference to FIGS. 12A and 12B, which are explanatory diagrams illustrating another operation of the second lens according to the first embodiment. FIGS. 12A and 12B are sectional views of each first lens 12a and each second lens 13a. In each of FIGS. 12A and 12B, the Z-axis direction (the vertical direction) is the direction parallel to optical axis AXL, and the Y-axis direction (the horizontal direction) coincides with the longitudinal direction of lens unit 1.

FIG. 12A shows the configuration according to the first embodiment. When the region (region 153 shown in FIG. 1) between the neighborhood of optical axis AXL of second lens 13 and crosstalk prevention portion 14a (region 152 shown in FIG. 1) is defined as the intermediate portion, the curvature of intermediate portion is smaller than the curvature of the neighborhood of optical axis AXL. On the other hand, FIG. 12B shows the different lens from the embodiment, in which the curvature of the aforementioned intermediate portion is not smaller than the curvature of the neighborhood of optical axis AXL. In the configuration of the first embodiment shown in FIG. 12A, intermediate image 30b of object 30a located on object plane OP is formed linearly on intermediate image plane IMP because the curvature of the intermediate portion is smaller than the curvature of the neighborhood of optical axis AXL.

On the other hand, in the case of the lens shown in FIG. 12B where the curvature of the intermediate portion is not smaller than the curvature of the neighborhood of optical axis AXL, an image located on the object plane in a remote position from optical axis AXL is formed in a position closer to the lens than intermediate image plane IMP by distance FC due to field curvature. Thus the image of object 30a is warped on object plane 30a. As a consequence, contrast of intermediate image 30b is reduced.

Next, lens units according to the embodiment and a comparative example are formed in order to verify the effects of the embodiment. Table 1 shows the dimensions of various regions of the lens unit of the first embodiment and those of the lens unit of the comparative example appearing in FIGS. 1, and 6 to 9. Table 2 shows the values of various coefficients in Numerical Expression 1 in terms of both of the lens units.

TABLE 1

| constituents | items | portions | values (mm) |
|---|---|---|---|
| lens unit | surface intervals | LO | 3.3 |
| | | LT1 | 1.3 |
| | | LS | 2.2 |
| | | LT2 | 1.3 |
| | | LI | 3.3 |
| lens plate | lens arrangement intervals | PY | 1.2 |
| | | PX | 0.8 |
| light-shield plate | dimensions of aperture 22 | RA | 0.4 |
| | | AB | 0.5 |
| | thickness of light-shield wall | TB | 0.4 |
| lens radii | first lens 12a | RY | 0.7 |
| | second lens 13a | RY | 0.7 |
| | | RI | 0.55 |
| | first lens 12b | RY | 0.7 |
| | second lens 13b | RY | 0.7 |
| | | RI | 0.55 |

TABLE 2

| surfaces | coefficients | numerical values |
|---|---|---|
| first lens 12a | CR | −0.8431 |
| | A | 0.3031 |
| | B | −0.3825 |
| | C | 0.7052 |

TABLE 2-continued

| surfaces | coefficients | numerical values |
|---|---|---|
| second lens 13a | CR | −1.130 |
| | A | 0.4494 |
| | B | 0.1655 |
| | C | 0.9536 |
| crosstalk prevention portion 14a | CRE | 1.1 |
| first lens 12b | CR | −0.8431 |
| | A | 0.3031 |
| | B | −0.3825 |
| | C | 0.7052 |
| second lens 13b | CR | −1.130 |
| | A | 0.4494 |
| | B | 0.1655 |
| | C | 0.9536 |
| crosstalk prevention portion 14b | CRE | 1.1 |

No crosstalk prevention portions 14a and 14b as shown in FIG. 9 are formed in the comparative example. Instead, the portion around each of second lenses 13a and 13b is formed into a flat surface. In both of the first embodiment and the comparative example, lens plates 11a and 11b shown in FIGS. 5 and 9 are made of a cycloolefin optical resin, or namely, ZEONEX (registered trademark) E48R (manufactured by Zeon Corporation) and are formed by injection molding. Light-shield plate 21 shown in FIGS. 5 and 9 is made of polycarbonate and is formed by injection molding.

Next, description is given of evaluation results on the performances of the lens units of the first embodiment and the comparative example. The LED head used in the performance evaluation of each of the lens units has LED elements 30 (shown in FIG. 3) arranged at pitch PD of 0.042 mm. To put it differently, 600 LED elements 30 are arranged in every inch (approximately equal to 25.4 mm), hence the LED head has a resolution of 600 dpi (dots per inch).

Figure 10:
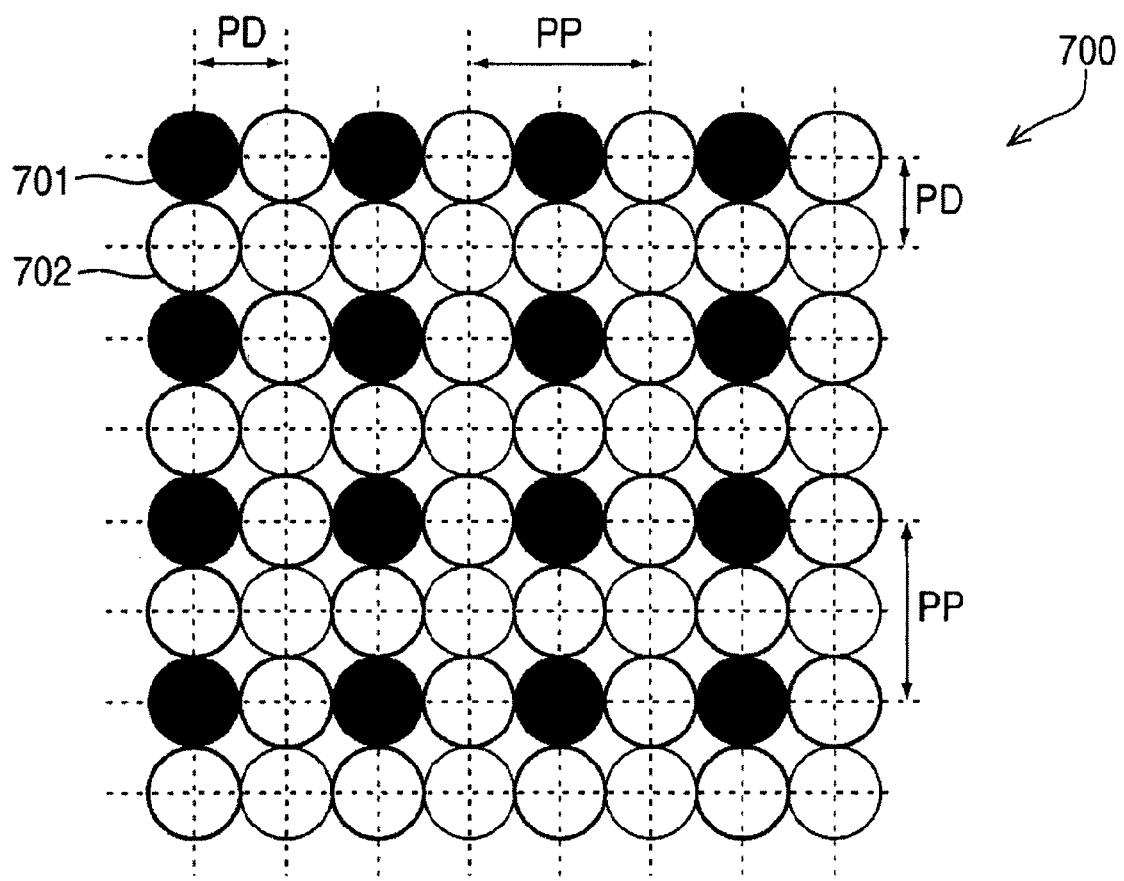
FIG. 10 is an explanatory diagram illustrating a print pattern according to the first embodiment.

First, pattern 700, including alternately arranged print dots 701 and blank dots 702 as shown in FIG. 10, is printed by using a printer equipped with the lens unit of the first embodiment and a printer equipped with the lens unit of the comparative example. The printer equipped with the lens unit of the first embodiment produces an image of good quality. On the other hand, an image printed by using the printer equipped with the lens unit of the comparative example results in density irregularity.

Details of pattern 700 are described with reference to FIG. 10. Pattern 700 includes print dots 701 and blank dots 702. Each print dot 701 is a toner image. On the other hand, each blank dot 702 is an area with no toner attached thereto, that is, an area where the surface of the paper is exposed. Print dots 701 are arranged at a pitch PP of 0.084 mm. A print image for evaluation is formed by alternately arranging print dots 701 and blank dots 702. Here, pitch PD between every two adjacent dots is equal to 0.042 mm.

The use of the lens unit of the comparative example fails to prevent the toner from adhering to the positions of blank dots 702. Consequently, the print produced by the lens unit of the comparative example is darker and less uniform, and therefore manifests density irregularity in comparison with the print produced by the lens unit of the embodiment.

Another pattern is prepared by arranging two rows of blank dots 702 in a feeding direction of the paper while densely arranging print dots 701 all over the region excluding the two rows of blank dots 702. When this pattern is printed by the printer of the embodiment, no toner adheres to the positions of blank dots 702. On the other hand, when the pattern is printed by the printer of the comparative embodiment, the toner adheres to the positions of blank dots 702 and the image is stained as a consequence.

As shown in FIG. 1, the curvature of region 152 for crosstalk prevention portion 14a in each second lens of the lens unit of the embodiment is formed larger than the curvature of region 151 in the neighborhood of the optical axis and the curvature of region 153 for the intermediate portion. Accordingly, the crosstalk rays are blocked by the light-shield plate and are prevented from reaching the image. Thus the high-contrast image is formed. As a consequence, the image formation apparatus equipped with the lens unit of the embodiment can produce a fine print image while avoiding adhesion of toner to blank regions of the image.

Note that each of first lenses 12a and second lenses 13a shown in FIG. 9 may have a different curved surface such as an anamorphic aspheric surface, an X-Y polynomial surface, a paraboloidal surface, an ellipsoidal surface, a hyperboloidal surface or a conic surface. Meanwhile, crosstalk prevention portions 14a may be formed only at the two end portions of second lenses 13a in the direction perpendicular to the longitudinal direction of first lens plate 11a. The above-mentioned configuration is described with reference to FIG. 13, which is a plan view illustrating the lens plate according to a modification of the first embodiment.

Figure 13:
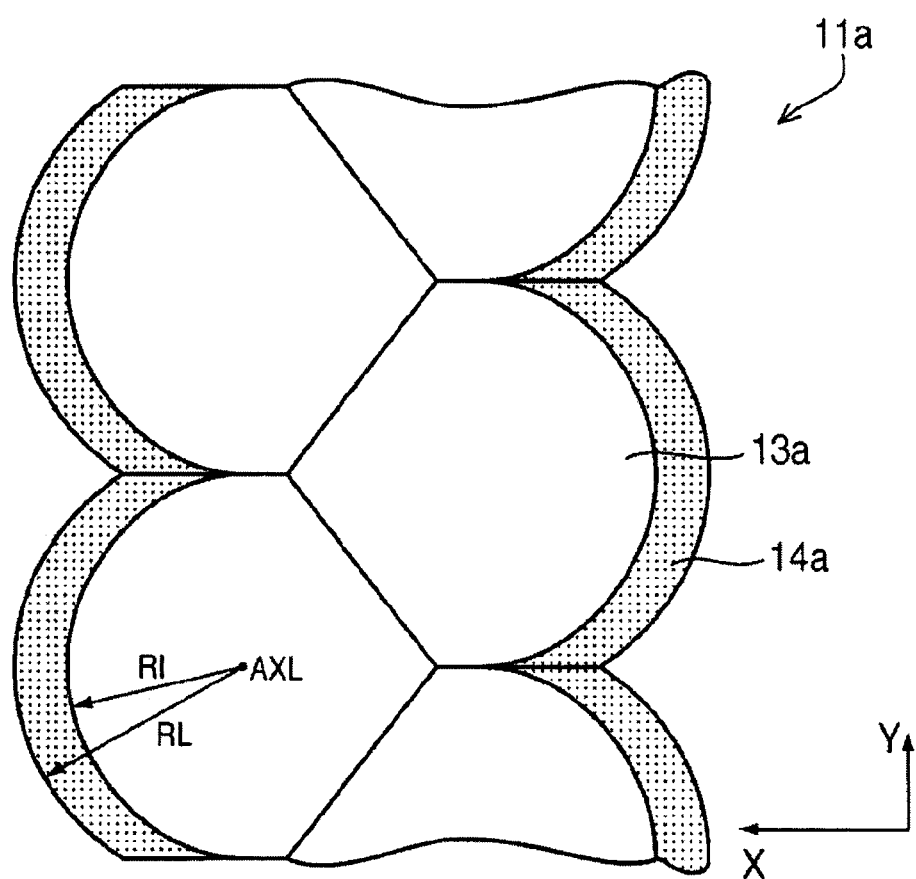
FIG. 13 is a plan view illustrating a lens plate according to a modification of the first embodiment.

FIG. 13 is a plan view illustrating first lens plate 11a. In FIG. 13, the Y-axis direction (the vertical direction) indicates the longitudinal direction of first lens plate 11a, and the X-axis direction (the horizontal direction) indicates a direction perpendicular to the longitudinal direction of first lens plate 11a. Crosstalk prevention portions 14a are located at two end portions in the X-axis direction in the neighborhood of second lenses 13a.

Figure 14:
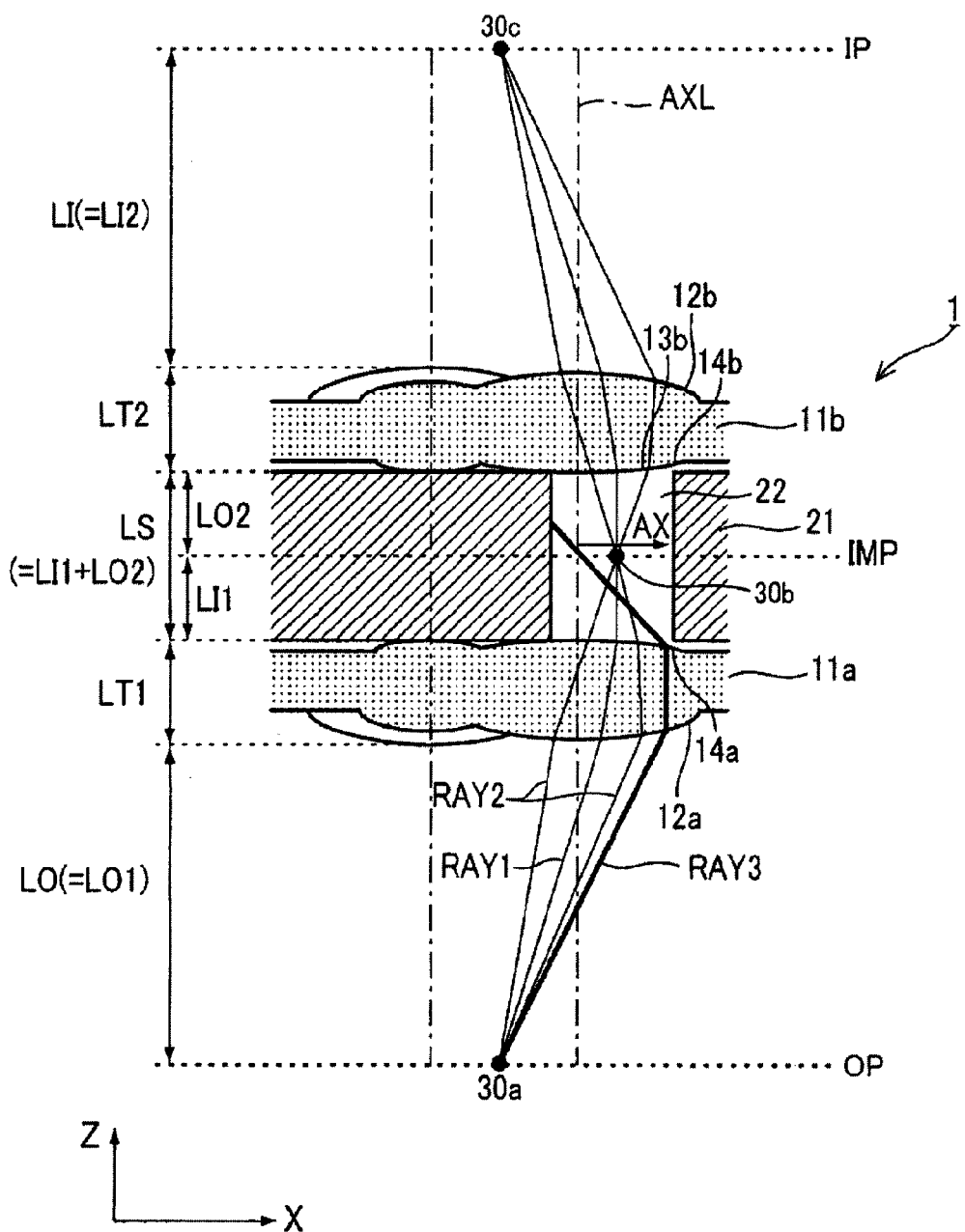
FIG. 14 is a sectional view illustrating a lens unit according to the modification of the first embodiment.

FIG. 14 is a sectional view of lens unit 1 taken along a plane that is perpendicular to the longitudinal direction of lens unit 1. In FIG. 14, the X-axis direction (the horizontal direction) is a direction perpendicular to the longitudinal direction of lens unit 1, and the Z-axis direction (the vertical direction) coincides with the direction of optical axis AXL.

Since crosstalk prevention portions 14a are located at the two end portions in the X-axis direction in the neighborhood of second lenses 13a, crosstalk rays are refracted towards the center in the direction perpendicular to the longitudinal direction of lens unit 1 and are absorbed by light-shield plate 21. To put it differently, crosstalk ray RAY3, entering the outer peripheral portion of certain first lens 12a and passing through the border between the certain first lens 12a and adjacent lens, enters crosstalk prevention portion 14a and is reflected towards the center in the X-axis direction (the horizontal direction) in FIG. 14. Then, ray RAY3 is absorbed by the internal wall of the aperture 22 formed in light-shield plate 21.

Note that crosstalk prevention portions 14b may also be formed at the two end portions in the direction perpendicular to the longitudinal direction in the neighborhood of second lenses 13b of second lens plate 11b, as similar to aforementioned crosstalk prevention portions 14a. As described above, the first embodiment includes the optical system configured in such a manner that the curvature of the region for the crosstalk prevention portion of the second lens is larger than the curvatures of the region in the neighborhood of the optical axis and the region for the intermediate portion, whereby the crosstalk rays are shielded by the light-shield member. Thus the LED head can form a high-contrast exposure image and the image formation apparatus can prevent reduction in the quality of printed images.

Second Embodiment

The description of the first embodiment is based on the assumption that the lens unit of the invention is applied to a printer serving as an image formation apparatus. In a second embodiment, a lens unit of the invention is applied to a reading apparatus. Now, a configuration of the second embodiment is described with reference to FIG. 15, which is a schematic diagram illustrating the configuration of the reading apparatus according to the second embodiment. Note that similar portions to those described in the first embodiment are designated by the same reference numerals and description thereof is omitted.

Figure 15:
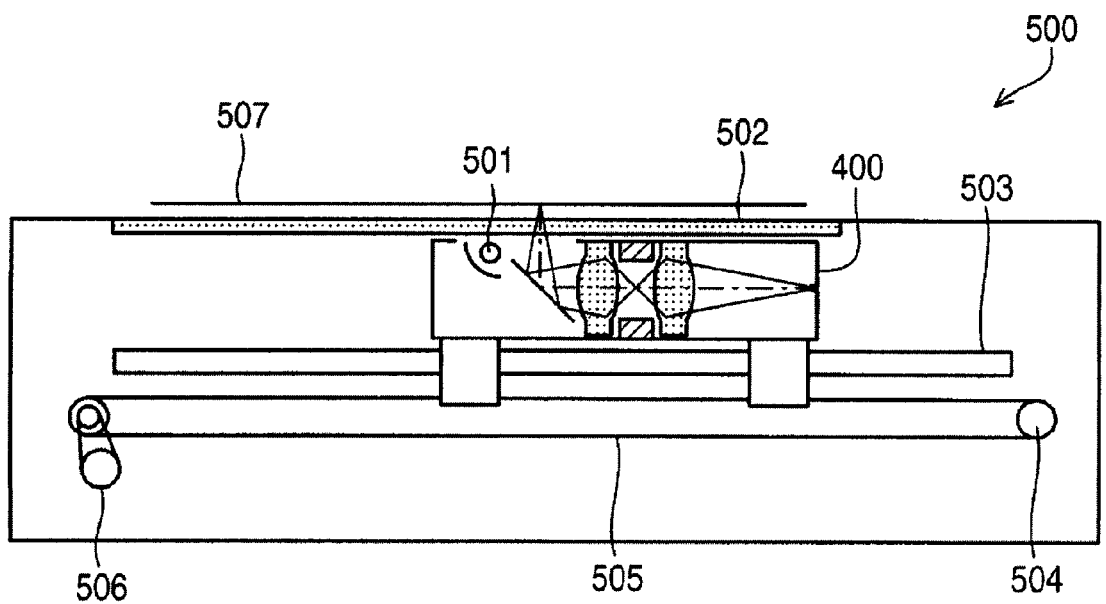
FIG. 15 is a schematic diagram illustrating a configuration of a reading apparatus according to a second embodiment.

In FIG. 15, reference numeral 500 denotes a scanner serving as a reading apparatus configured to read an original document and create electronic data as image data. Scanner 500 includes, among other things, reading head 400, lamp 501, platen 502, rail 503, drive belt 505, and motor 506.

Reading head 400 is configured to capture light rays which are emitted from lamp 501 serving as a lighting device and reflected by the surface of the original document, and to convert the light rays into the electrical data. Lamp 501 is located such that the light rays emitted from lamp 501 can be reflected by the surface of the original document and captured by reading head 400. Platen 502 is configured to serve as a place to mount original document 507 from which electronic data are created, and is made of a material that transmits visible light.

Rail 503 is located below platen 502 and makes reading head 400 movable. A portion of reading head 400 is connected to drive belt 505, which is wound around pulleys 504. Reading head 400 is made movable on rail 503 by means of drive belt 505 driven by motor 506.

Figure 16:
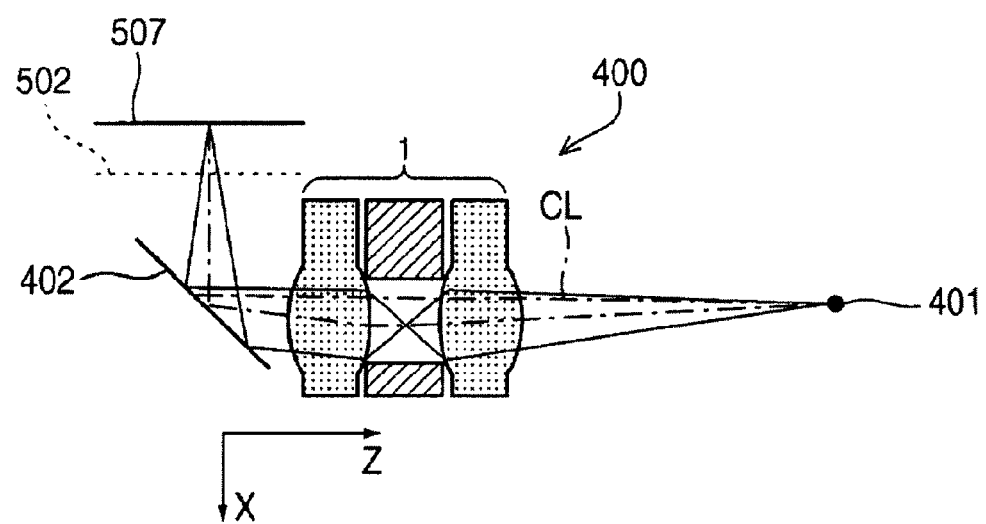
FIG. 16 is a schematic diagram illustrating a configuration of a reading head in the reading apparatus according to the second embodiment.

Next, the configuration of reading head 400 is described with reference to FIG. 16, which is a schematic diagram illustrating the configuration of the reading head of the reading apparatus according to the second embodiment. As shown in FIG. 16, reading head 400 includes lens unit 1, line sensor 401, and mirror 402.

Mirror 402 is configured to bend an optical path of the light rays reflected by the surface of original document 507 and to cause the light rays to enter lens unit 1. Line sensor 401 includes photo acceptance units which are substantially linearly arranged. Line sensor 401 converts an image formed by lens unit 1 based on an image on the original document into electric signals.

Figure 17:
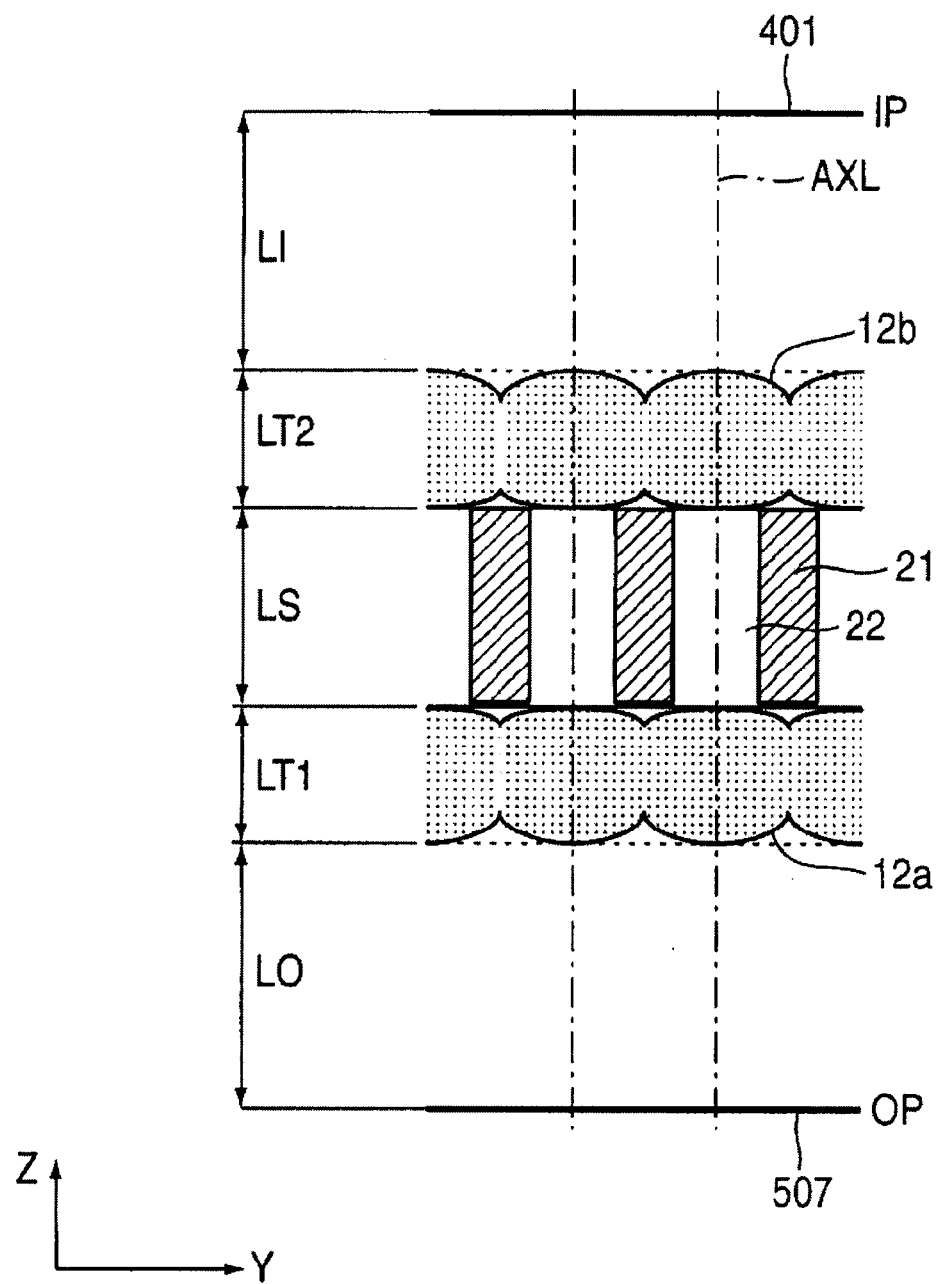
FIG. 17 is a schematic diagram illustrating another view of the configuration of the reading head in the reading apparatus according to the second embodiment.

Meanwhile, FIG. 17 shows the configuration of reading head 400 according to the second embodiment and a positional relationship between object plane OP (original document 507) and image plane IP therein. In this embodiment, object plane OP of lens unit 1 is aligned with original document 507 while image plane IP is aligned with line sensor 401. The configuration of lens unit 1 according to the second embodiment is similar to the configuration of lens unit 1 according to the first embodiment.

Operations of the above-described configuration are described. First, operations of reading apparatus are described with reference to FIG. 5. Lamp 501 is turned on and illuminates the surface of original document 507. Thus, the light rays reflected by the surface of original document 507 are introduced into reading head 400. Motor 506 drives drive belt 505, whereby both reading head 400 and lamp 501 are moved in the right-and-left directions in FIG. 15. Accordingly, reading head 400 captures the light rays reflected by the entire surface of original document 507.

Next, operations of reading head 400 are described with reference to FIG. 16. The light rays reflected by the surface of original document 507 pass through platen 502, and then the optical path of the light rays is bent by mirror 402. The bent light rays of light enter lens unit 1. The image of original document 507 captured by lens unit 1 is formed on line sensor 401, and line sensor 401 converts the image of original document 507 thus formed into the electric signals to create the electronic data.

When image data are formed from an original document by using the reading apparatus according to the second embodiment, the image data thus formed have as good a quality as the quality of the original document. The description of the second embodiment is based on the assumption that a scanner is used as an example of the reading apparatus that converts the image on the original document into the electronic data. Instead, the reading apparatus may be any of a sensor and a switch configured to convert optical signals into electric signals. Moreover, the reading apparatus may be any of an input-output device, a biometric authentication apparatus, a communication apparatus, a dimension-measurement apparatus, and the like which use the aforementioned sensor and switch.

As described above, according to the second embodiment, crosstalk rays are blocked by the reading apparatus as similar to the first embodiment. Accordingly, the reading apparatus of the second embodiment can read image data that are identical to the original document.

Note that, in the first and second embodiments, each lens in the lens array includes: the first region having the first curvature; and the second region located farther away from the optical axis than the first region and having the second curvature, wherein the second curvature is larger than the first curvature. However, all the lenses in the lens array do not need to satisfy the configuration. For example, in an embodiment, at least two adjacent lenses can satisfy this configuration. In another embodiment, substantially all of the arrayed lenses in the lens array satisfy the configuration. And in yet another embodiment, 70 percent or more of all the arrayed lenses in the lens array satisfy the configuration.

Further, in the first and second embodiments, each of the lenses in the lens array includes: the first region having the first curvature; the second region located farther away from the optical axis than the first region and having the second curvature; and the third region connecting the first region and the second region to each other and having the third curvature, wherein the second curvature is larger than the first curvature and the third curvature is smaller than the first curvature. However, all the arrayed lenses in the lens array do not need to satisfy the configuration. For example, in an embodiment, at least two adjacent lenses can satisfy this configuration. In another embodiment, substantially all of the arrayed lenses in the lens array satisfy the configuration. And in yet another embodiment, 70 percent or more of all the arrayed lenses in the lens array satisfy the configuration.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A lens array comprising:
arranged lenses, wherein
each of at least two adjacent lenses in the lens array includes:
a first region located at and around an optical axis of the lens and having a first curvature;
a second region located farther away from the optical axis than the first region and having a second curvature, and
a third region provided between the first region and the second region, the third region connecting the first region and the second to each other, and the third region having a third curvature different from the first and second curvatures,
the second curvature is larger than the first curvature.

2. The lens array according to claim 1, wherein the third curvature is smaller than the first curvature.

3. The lens array according to claim 1, wherein the second region is a crosstalk prevention portion.

4. The lens array according to claim 3, wherein
the optical axes of the lenses are parallel to one another,
the lenses are arranged with the optical axes thereof placed in parallel to one another and with no appreciable gap interposed therebetween in a direction perpendicular to the optical axes of the lenses, and
the crosstalk prevention portions are located at outer peripheral portions of the lenses.

5. The lens array according to claim 4, wherein the crosstalk prevention portions are formed only at two end portions in a neighborhood of the lenses in a direction perpendicular to a longitudinal direction in which the arranged lenses are formed as a lens plate.

6. An LED head comprising the lens array according to claim 1.

7. An image formation apparatus comprising the lens array according to claim 1.

8. A reading apparatus comprising the lens array according to claim 1.

9. The lens array of claim 1, wherein
each of 70 percent or more of the arranged lenses in the lens array includes:
the first region located at and around the optical axis of the lens and having the first curvature; and
the second region located farther away from the optical axis than the first region and having the second curvature, the second curvature being larger than the first curvature.

10. A lens unit comprising:
lens arrays; and
a light-shield member provided between the lens arrays, wherein
each of the lens arrays includes arranged lenses,
each of at least two adjacent lenses in the lens array includes:
a first region located at and around an optical axis and having a first curvature;
a second region located farther away from the optical axis than the first region and having a second curvature, and
a third region provided between the first region and the second region, the third region connecting the first region and the second to each other, and the third region having a third curvature different from the first and second curvatures,
the second curvature is larger than the first curvature.

11. The lens unit according to claim 10, wherein
the light-shield member comprises:
an aperture configured to transmit a light ray passing through each of the lenses in the lens array; and
a light-shield portion configured to block a light ray passing through the second region of one of the lenses adjacent to the lens.

12. The lens unit according to claim 11, wherein
the lens arrays comprise a first lens array and a second lens array, the first lens array forms a reduced inverted image of an object, and the second lens array forms a same-size erect image of the object by forming an enlarged inverted image of the reduced inverted image.

13. An LED head comprising the lens unit according to claim 10.

14. The lens unit according to claim 10, wherein the third curvature is smaller than the first curvature.

15. The lens unit according to claim 10, wherein the second region is a crosstalk prevention portion.

16. The lens unit according to claim 15, wherein the optical axes of the lenses are parallel to one another, the lenses are arranged with the optical axes thereof placed in parallel to one another and with no appreciable gap interposed therebetween in a direction perpendicular to the optical axes of the lenses, and the crosstalk prevention portions are located at outer peripheral portions of the lenses.

17. The lens unit according to claim 16, wherein the crosstalk prevention portions are formed only at two end portions in a neighborhood of the lenses in a direction perpendicular to a longitudinal direction in which the arranged lenses are formed as a lens plate.

* * * * *